(12) United States Patent
Barletta

(10) Patent No.: US 9,246,684 B2
(45) Date of Patent: Jan. 26, 2016

(54) DATA PROTECTION SYSTEM AND METHOD

(71) Applicant: Alenia Aermacchi S.p.A., Venegono Superiore (IT)

(72) Inventor: Alessandro Barletta, Turin (IT)

(73) Assignee: Alenia Aermacchi S.p.A., Venegono Superiore (IT)

( * ) Notice: Subject to any disclaimer, the term of this patent is extended or adjusted under 35 U.S.C. 154(b) by 426 days.

(21) Appl. No.: 13/901,986

(22) Filed: May 24, 2013

(65) Prior Publication Data

US 2014/0351582 A1    Nov. 27, 2014
US 2015/0326396 A9    Nov. 12, 2015

(30) Foreign Application Priority Data

May 28, 2012    (IT) .............................. TO2012A0462

(51) Int. Cl.
*G06F 21/62* (2013.01)
*H04L 9/32* (2006.01)
*G06F 21/10* (2013.01)

(52) U.S. Cl.
CPC .............. *H04L 9/3213* (2013.01); *G06F 21/10* (2013.01); *G06F 21/6209* (2013.01); *H04L 9/3226* (2013.01); *H04L 9/3234* (2013.01); *G06F 2221/0711* (2013.01); *G06F 2221/2107* (2013.01); *G06F 2221/2153* (2013.01)

(58) Field of Classification Search
CPC ... H04L 9/3213; H04L 9/3234; H04L 9/3226; G06F 21/10; G06F 21/6209; G06F 2221/2107; G06F 2221/2153; G06F 2221/0711

USPC ......................................................... 713/159
See application file for complete search history.

(56) References Cited

U.S. PATENT DOCUMENTS

| | | | | |
|---|---|---|---|---|
| 5,742,035 A | * | 4/1998 | Kohut ................. | G06Q 20/347 235/380 |
| 2004/0117575 A1 | * | 6/2004 | Link ..................... | G06F 21/79 711/163 |
| 2004/0225880 A1 | * | 11/2004 | Mizrah ................. | G06F 21/46 713/155 |
| 2011/0289576 A1 | * | 11/2011 | Cheng .................. | G09C 1/00 726/9 |

* cited by examiner

*Primary Examiner* — Harunur Rashid
(74) *Attorney, Agent, or Firm* — Gottlieb, Rackman & Reisman, P.C.

(57) ABSTRACT

An authentication system to authorize access to data to be protected, including a token having a memory that stores: an array containing alphanumeric information and random data; and a seal scheme vector containing information to enable access to each of the information items in their respective positions in the array. The authentication system is configured to: subject access to the token to the insertion of a password; decrypt the seal scheme vector; acquire the arrangement information and the size information of each random data from the seal scheme vector; check correspondence between the acquired arrangement information and the effective arrangement of the information in the array, and between the acquired size information and the effective size of the random data; authorize or deny access to the data to be protected on the basis of a result of the previous check.

26 Claims, 6 Drawing Sheets

DATA PROTECTION SYSTEM AND METHOD

CROSS-REFERENCE TO RELATED APPLICATION

This patent application claims the benefit under 35 U.S.C. §119 to IT TO2012A 000462, filed May 28, 2012, which is hereby incorporated by reference as part of the present disclosure.

The present invention relates to a system and method for protecting information data and, in particular, for checking and granting authorization to access information data.

BACKGROUND OF THE INVENTION

There are known data protection methods, in particular methods for authorizing access to protected information and/or allowing the execution of computer programs (software) subject to obtaining a license to use them.

Known methods contemplate the use of a key not know to the user and obtainable by purchasing a license to use the software in question. This method has the drawback that this key can be fraudulently replicated, so that unauthorized users who learn about this key are able to use the software.

Other methods contemplate the use of a device, called a token, able to generate a password, generally in a numeric format, on the basis of an algorithm unknown to the user. Typically, in a two-factor authentication scheme, this password assumes a value, dependent on parameters that vary with time (e.g., time, date, etc.), plus a known part, chosen by the user (known as the Personal Identification Number or, more simply, the PIN) so as not to be easily replicable. This method has the drawback that everyone knows the time and the PIN is usually chosen by a user so that it is easy to remember (in practice, the PIN is often chosen as the user's date of birth, the names of dear ones, etc.). There are known attacks of various types that drastically reduce the protection provided by this type of scheme.

Other known methods include the steps of storing entire portions of software on the token, but in this way there is an impact on software's speed of execution, linked to the fact that it is necessary to access these portions, compile them and then execute them. In consequence, she check is usually carried out only in the software's start-up phase and not during all of the time period in which the software is used.

SUMMARY OF THE INVENTION

The object of the present invention is to provide a data protection system and method able to overcome the drawbacks of the prior art.

In greater detail, the authentication system is based on a token accessible by means of a PIN, and is configured to authorize or deny access to information to be protected, the token having a memory that stores: an array containing numerical and/or alphanumerical and/or alphabetic information items, and random numerical and/or alphanumerical and/or alphabetic data interposed between immediately consecutive information items in a reading order of the array; and an encrypted seal scheme vector (or seal scheme array), containing information regarding the arrangement of the information items in the array and information regarding the size (typically in bytes) of each random data item, so as to enable access to each of the information items in their respective positions in the array. The authentication system is configured to: subject access to the token to entering a correct PIN; decrypt the seal scheme vector; acquire the arrangement information of the information items and the information on the space occupied by each random data item from the seal scheme vector; check correspondence between the acquired arrangement information and she effective arrangement of the information items in the array, and between the acquired size information and the effective size of the random data; authorize or deny access to the information to be protected on the basis of a result of the previous check.

According to the present invention, a data protection system and method are provided, as defined in the appended claims.

BRIEF DESCRIPTION OF THE DRAWINGS

For a better understanding of the present invention, some preferred embodiments will now be described, purely by means of non-limitative example and with reference to the attached drawings, where.

DETAILED DESCRIPTION OF THE INVENTION

The present description relates to a system and method for protecting data and, in particular, to cypher or encrypt electronic data.

More in detail, the levels of protection provided by the present invention comprise: a physical level, including an authentication device or token, able to generate a pseudorandom authentication code, for example, in a numeric, alphabetic or alphanumeric format; and a software level, including cryptographic steps performed by means of a computer program.

Figure 1:
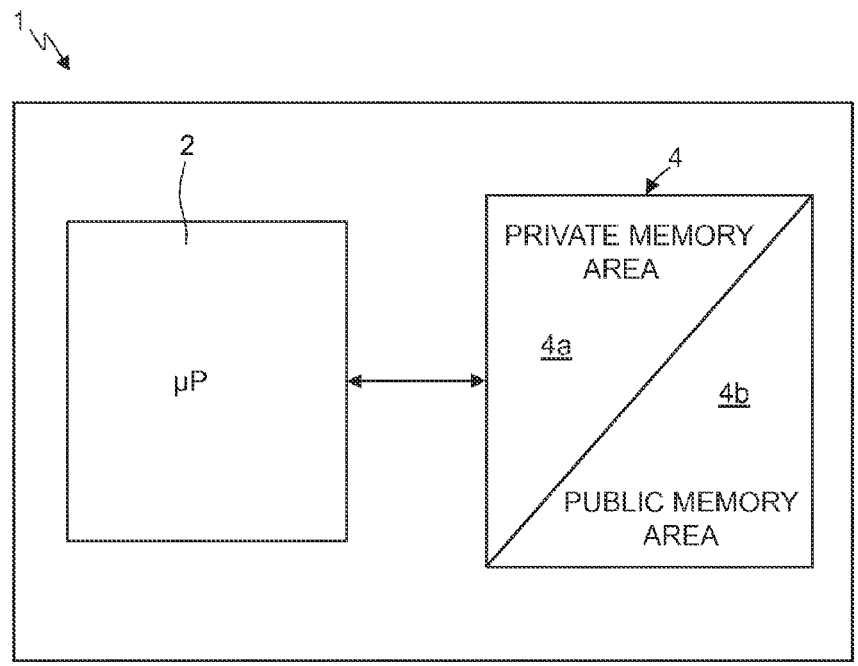
FIG. 1 schematically shows a device, or token, for generating authentication keys.

The authentication token, schematically shown in FIG. 1 and indicated by reference numeral 1, comprises a microprocessor 2 of known type, able to generate, upon user request, the pseudorandom authentication code according to a certain algorithm, which can take a plurality of factors into account, such as, for example, the serial number of the authentication token 1, a current date value, a time value defined by a clock inside the authentication token 1, or other factors. This value is generated via hardware by a time-based algorithm and can vary between different token manufacturers. Typically, how the pseudorandom authentication code is generated by the token is not disclosed and each token supplier adopts a proprietary algorithm. The method according to the present invention is independent of the way in which this authentication code is generated and so the latter is not described any further herein.

The authentication token 1 also comprises a memory 4, for example a flash-type memory, connected to the microprocessor 2.

The program for generating the authentication code resides in the memory 4 of the authentication token 1, in particular in a private area 4a of the memory 4, to be used for storing sensitive data accessible by means of a keyword, or PIN (Personal Identification Number). A public area 4a of the memory 4 can store certificates of a public nature and non-sensitive information.

The PIN is generated automatically and is not made available to the end user. Upon installation, or when the software is first run, the user is prompted to choose a password of his/her liking that unlocks utilization of the PIN and stores the hash (i.e. the result of an operation that is non-reversible or reversible "with difficulty"—in a database).

The private area 4a of the memory 4 can be of the hidden type (the user is not aware of its presence), or visible to the user, but with access protected by a keyword or password. This password can be modified, subject to having the seed record generated by the supplier and the authorization of the token administrator (known as the Security Officer) that is protected by another password, typically modifiable and not overwritable, which is set to a predetermined value and saved in a secure location.

The private area 4a of the memory 4 can be used to store a plurality of data and/or information, used during the steps of the cryptographic method, as better illustrated hereinafter.

Figure 2:
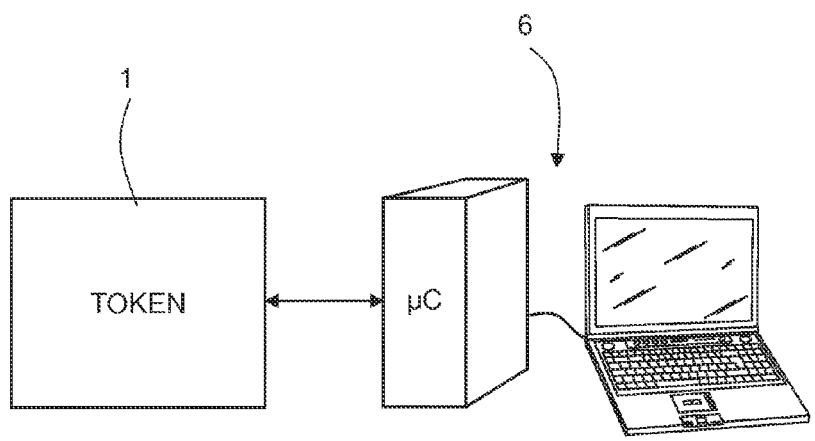
FIG. 2 shows a computer, of a type in itself known, suitable for being operatively connected to the token in FIG. 1.

In one embodiment, the authentication token 1 can be connected to a computer 6 (FIG. 2), so that information can be exchanged between the authentication token 1 and the computer 6. For example, the authentication token 1 could be equipped with a USB port for connection to the computer 6.

Hereinafter, reference is made to a plain text that it is wished to encode in order to prevent an unauthorized user accessing the information contained in the plain text.

Figure 3:
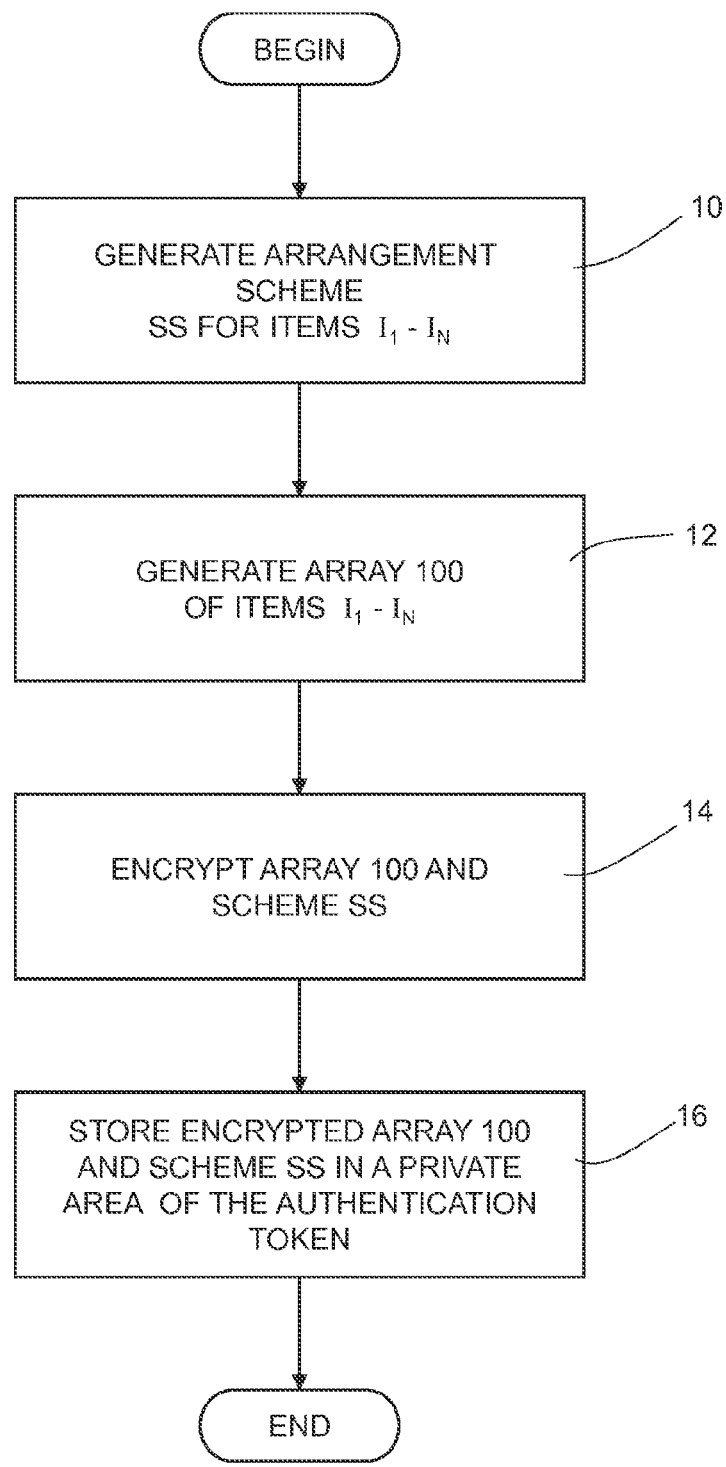
FIG. 3 shows, by means of a flowchart, the steps of a data protection method according to one embodiment of the present invention.

With reference to FIG. 3, a flowchart is shown that includes steps of the encryption method according to one embodiment of the present invention.

According to the present invention, a "seal" is generated that includes a plurality of data and information, chosen on a discretional basis, which is encrypted according to a random scheme. The decryption and reading of this seal is a requisite for authorizing or denying one or more further activities.

According to a preferred application, the decryption and reading of this seal is a requisite for authorizing the execution of a software program, or obtaining a license to use this software program. The encryption steps according to the method of the present invention are not therefore aimed at encrypting the software program to be executed, but to generating an encrypted seal, the reading of which is necessary for obtaining authorization to execute this software program.

The method according to FIG. 3 comprises initialization steps (steps 10 and 12) during which the seal is generated from the plain text and is written in the private area 4a of the memory 4, and encryption steps (steps 14 and 16) during which a cryptographic method of known type (for example, a known method chosen from RSA, AES, DES, or others) is used to encrypt the seal generated in steps 10 and 12 in order to guarantee a further level of protection.

The seal is generated on the basis of the data and/or information that constitute the plain text, arranging this data in an array as better described hereinafter. In addition, the seal has a size, in bits, such as to be compatible with the encryption algorithm used in steps 14 an 16 (for example, a length of 128 bits, or 196 bits, or 256 bits, or some other size) and leave sufficient "free" spaces to fill with random data.

The plain text can comprise a plurality of data and/or information of a fixed type (the value or information content of which does not vary with time) and/or a variable type (the value or information content of which is not the same if considered at different moments in time). Fixed data includes, for example, predetermined identification codes in the form of numbers, letters and/or alphanumerics or some other format, such as, for example, one or more of: trade name or code name of the software, name of the software manufacturer, progressive license number for the current user of the software, customer name and/or identification code, initialization date, token serial number, software modules to enable (in the case of software composed of multiple modules) and associated license password/codes, and other optional data.

Variable data includes, for example, values for the current date, current time, or other data that can take a variable value on the basis of predetermined or unplanned conditions.

With regard to variable fields, the correctness of their content is checked "by appointment". In other words, the software component checks that given a time value written at time $t_0$, after "x" seconds have passed, the time value is time $t_0+x$ (plus or minus a tolerance of the order of hundreds of milliseconds). The value $t_0$ is the moment when the date/time value written and "x" is a variable offset determined instantaneously and randomly by the software according to a freely chosen uniform distribution, the limits of which are specified between a minimum and a maximum, usually of the order of tens of seconds/minutes.

Hereinafter in the description, each data item, fixed or variable, is considered as a single "item" and indicated by references $I_1, I_2, I_3, \ldots, I_N$. A plurality N of items $I_1$-$I_N$ of this type form a set (arranged in the form of a vector I) comprising a number N of items $I_1$-$I_N$: $I=\{I_1, I_2, I_3, I_4, I_5, \ldots, I_N\}$ As mentioned, one application of the present invention is to authorize or deny execution of a software program, or to obtain a license to use this software program. In this case, a copy of the vector I is saved in the software program in a manner that is not accessible to a user of the software program.

When considered in their digital format (as a sequence of bits with logical values "1" or "0"), each item. $I_1$-$I_N$ of the set of N items $I_1$-$I_N$ has its own length L(i), measurable as a number of bits and/or bytes, where 1 byte is a group of 8 bits. In this case, "i" takes values comprised between 1 and N, and therefore L(1) is the length of the first item of vector I, L(2) is the length of the second item of vector I, and so on, where L(N) is the length of the N'th (last) item of vector I.

Furthermore, each item $I_1$-$I_N$ has its own value J(i), or $J_1$-$J_N$. For example, if the item $I_1$-$I_N$ is a date, the value J(i) of this item is an actual date, for example in the day/month/year format. If the item $I_1$-$I_N$ is the name of the software manufacturer, the value J(i) of that item is she name of the manufacturer, and so on. Therefore, for each item the value J(i) has, indifferently, a numeric, alphanumeric or alphabetic value.

The above-mentioned items $I_1$-$I_N$ are arranged in an array 100 having a plurality M of fields defined by the intersection of a row x (with $x=x_1, x_2, \ldots, x_R$) with a respective column y (with $y=y_1, y_2, \ldots, y_C$). The array 100 is represented graphically in FIG. 4. The N items $I_1$-$I_N$ each occupy a respective field (x, y) of the array 100. The array 100 has a number of fields equal to $M=x_R \cdot y_C$ and greater than N. In particular, the value of M is chosen so that the items $I_1$-$I_N$ are stored in respective fields (x, y) that are not directly consecutive to each other and so as to support the chosen encryption algorithm. In other words, the field immediately following, along the rows of the array 100, a field containing an item $I_1$-$I_N$, does not contain another of the items $I_1$-$I_N$.

When all the items $I_1$-$I_N$ have been written in the array 100, the fields (x, y) of the array 100 left free are filled by randomly generated bytes, by means a random number generator of known type. In this way, each item $I_1$-$I_N$ is separated from the other items $I_1$-$I_N$ by one or more random bytes.

In FIG. 1, the random bytes are indicated by $RB_{x,y}$, where subscripts x,y take the value of the corresponding row x and the corresponding column y of the field in which the random bytes are written. For example, one or more random bytes $RB_{1,1}$ are stored in the field identified by the first row x=$x_1$ and the first column y=$y_1$. Similarly, one or more random bytes $RB_{2,2}$ are stored in the field identified by the second row x=$x_2$ and the second column y=$y_2$.

Figure 4:
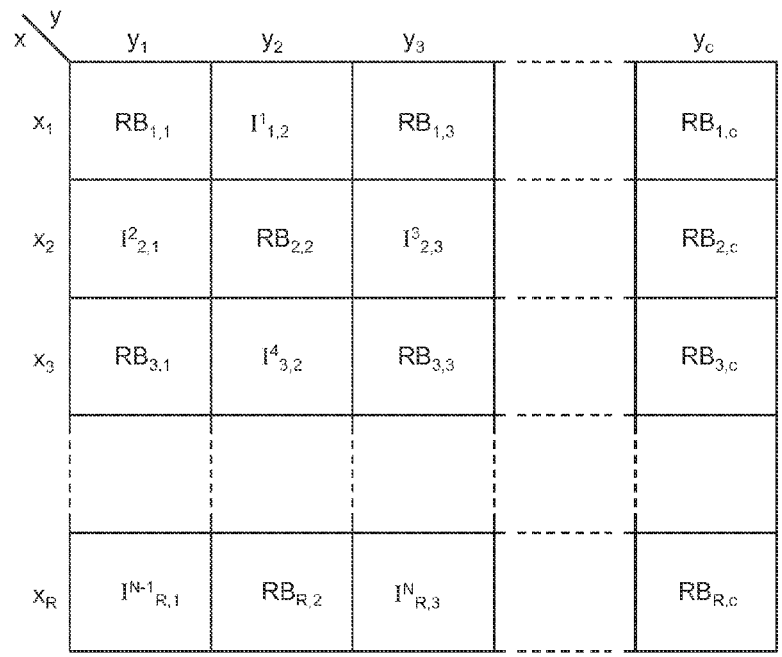
FIG. 4 shows, in graphical form, an array comprising a plurality of data/information items encoded according to steps 10 and 12 of the method in FIG. 3.

Always with reference to FIG. 4, item $I_1$ occupies the field corresponding to the first row x=$x_1$ and the second column y=$y_2$, and is indicated as $I^1_{1,2}$; similarly, item $I_2$ occupies the field corresponding to the second row x=$x_2$ and the first column y=$y_1$, and is indicated as $I^2_{2,1}$; and so on.

As can be noted in FIG. 3, the random bytes $RB_{x,y}$ are inserted both between the items $I_1$-$I_N$ (when considered in sequence along the rows $x_1$-$x_R$) and before the first item $I_1$ of the array 100, as well as after the last item $I_N$ of the array 100. In other words, according to this embodiment, both the first field of the array 100 and the last field of the array 100 contain random bytes $RB_{x,y}$.

Figure 5:
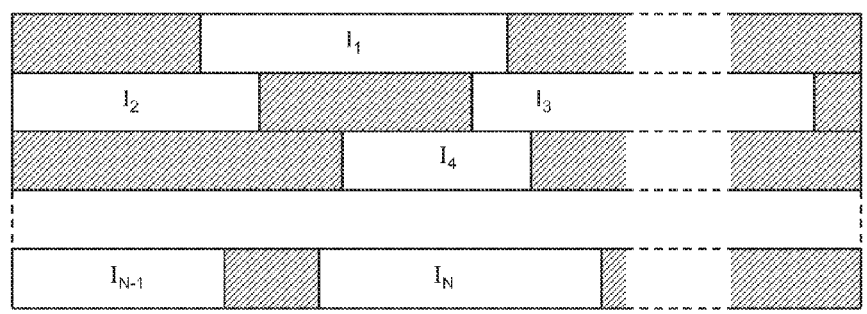
FIG. 5 shows the array of FIG. 4 according to a different form of graphical representation.

It is clear that the length in bytes of each item $I_1$-$I_N$ and of each sequence of random bytes $RB_{x,y}$ can have any length, in bytes. Fields x,y of the array 100 that are different from each other can contain a different number of bytes. This situation is shown by way of a graphical example in FIG. 5, where random bytes are graphically shown by fields filled with hatched lines and items by blank fields.

According to one embodiment, each field (x, y) of the array 100 is unambiguously identified by an identification number less than or equal to M, and vice versa. The association of an identification number to each field of the array 100 is implemented, for example, by progressively traversing the array 100 along the rows x, so that the number "1" corresponds to field (x=1, y=1), number "2" corresponds to field (x=1, y=2), and so on, so that number "M" corresponds to field (x=$x_R$, y=$y_C$). It is clear that any other association is also possible.

Returning to FIG. 3, step 10 comprises defining a set $V_I$ of N integer values identifying the reciprocal order in which the items $I_1$-$I_N$ must be inserted in the array 100. The order is, for example, considered as starting from the first field of the array 100 and traversing the rows x. However, any other order can be chosen.

As shown in FIG. 4, each item $I_1$-$I_N$ is separated from the others items $I_1$-$I_N$ by a field (x, y) of the array 100 containing a sequence of random bytes $RB_{x,y}$. To this end, in step 10 of FIG. 3, a set $V_{RB}$ of N+1 random numbers is generated in which each one of these numbers identifies the length, in bytes, of a respective sequence $RB_{x,y}$ which must be inserted in the array 100 as a separator of the items $I_1$-$I_N$.

Therefore, the (vector) set $V_I$ identifies the order in which to insert the items $I_1$-$I_N$ in the array 100 and the (vector) set $V_{RB}$ identifies the length of each block $RB_{x,y}$ that must be inserted between one item $I_1$-$I_N$ and the next item $I_2$-$I_N$ (and also at the beginning and end of the array 100). The vectors $V_I$ and $V_{RB}$ are saved in a seal scheme vector SS having the following form (the numeric values indicated in the seal scheme vector SS are illustrative of a possible embodiment and are not limitative):

$$SS=\{V_I;V_{RB}\}=\{1,2,3,4,\ldots;23,4,46,5,11,\ldots\}.$$

In this way, in the absence of the seal scheme vector SS, the simple reading of the array 100 does not allow easily recovering the information (i.e. it is not possible to immediately trace the plain text, or rather the items $I_1$-$I_N$) contained in the array 100.

Vector $V_I$ comprises N fields (and therefore N values in the case where each field contains a single value), and vector $V_{RB}$ comprises N+1 fields (and consequently N+1 values in the case where each field contains just one value); the seal scheme vector therefore comprises 2N+1 values, where the value of SS (N+1) is the number of bytes that precede the first item in the array 100; the value of SS(N+2) is the number of bytes between the first item $I_1$ and the second item $I_2$ in the array 100; the value of OS (N+3) is the number of bytes between the second item $I_3$ and the third item $I_3$ in the array 100; and so on. The value of SS(2N+1) is the number of bytes added in the array 100 after the last item $I_N$.

As previously mentioned, the step of defining the (vector) set $V_I$ is the equivalent of defining N identification numbers of an order in which to reciprocally insert the items $I_1$-$I_N$ in the array 100. It should be noted that the N values that form vector $V_I$ do not identify respective fields of the array 100, but represent the order of insertion of the items $I_1$-$I_N$ in the array 100, for example, when considered in sequence along the rows x of the array 100. Similarly to what has been described hereto, vector $V_I$ is, by way of example, of the type:

$$V_I=\{1,2,3,4,\ldots\}.$$

Vector $V_I$ is interpreted in the following manner: insert item $I_1$ as the first item in the array 100 ($I(V_I(1))=\{I_1\}$, because $V_I(1)=\{1\}$ and $I(1)$-$I_1$); insert item $I_2$ as the second item in the array 100 ($I(V_I(2))=\{I_2\}$, because $V_I(2)=\{2\}$ and $I(2)=I_2$); insert item $I_3$ as the third item in the array 100 ($I(V_I(3))=\{I_3\}$, because $V_I(3)=\{3\}$ and $I(3)=I_3$); insert, item $I_4$ as the fourth item in the array 100 ($I(V_I(4))=\{4\}$, because $V_I(4)=\{4\}$ and $I(4)=I_4$); and so on for all N items $I_1$-$I_N$ of vector I.

Always as a qualitative example, the step of defining the set of N+1 random numbers in which each of these numbers identifies the length of a respective block $RB_{x,y}$ results in the generation of vector $V_{RB}$, of the following type:

$$V_{RB}=\{23,4,46,5,11,\ldots\}.$$

Vector $V_{RE}$ is interpreted in the following manner: insert twenty three random bytes immediately before the first item in the array 100, as defined by vector $V_I$ (in this example, before item $I_1$); insert four random bytes immediately after the first item in the array 100, as defined by vector $V_I$ (in this example, after item $I_1$); insert forty six random bytes immediately after the second item in the array 100, as defined by vector $V_I$ (in this example, after item $I_2$); insert five random bytes immediately after the third item in the array 100, as defined by vector $V_I$ (in this example, after item $I_3$); insert eleven random bytes immediately after the fourth item in the array 100, as defined by vector $V_I$ (in this example, after item $I_4$).

The ordering operation of the items $I_1$-$I_N$ in the array 100 (i.e. generating vector $V_I$, steps 10 and 12 in FIG. 3), and/or the generation of vector $V_{RB}$, can be performed any number of times, and enables cyclic updating of the array 100, at regular intervals and/or following special predetermined events. The seal scheme vector SS is also updated in a corresponding manner. In particular, given N items $I_1$-$I_N$, these have N! possible permutations before the starting order of the array 100 is obtained again. This means that the ordering of the items $I_1$-$I_N$ as defined by vector $V_I$ can be changed N! times before returning to the initial order.

In practice, having chosen two first integer numbers "A" and "B", with values between 1 and M, a shuffle function is performed so that the following operations are performed A times:

(1) permuting the position of a first value of vector $V_I$ with the position of a second value of vector $V_I$ (the two positions being chosen arbitrarily or by using two different counters); and
(2) swapping the position of one or more values of vector $V_I$ with the position of respective one or more values of vector $V_I$, these positions being after the position in which the first value mentioned in the previous point (1) was originally contained.

The permuting step (1) is performed "B" times on "B" different values, so as to generate a vector $V_I$ that contains values ordered in a manner that is not predeterminable beforehand.

The value of B is chosen randomly and such that B is not a divisor of $N! \cdot (N+1)!$. In this way, the two numbers B and $N! \cdot (N+1)!$ are mutual primes and, exploiting the fact that they are not perfectly divisible, returning again to the same values after a certain number of repetitions is avoided.

In greater detail, the permuting operation (1) comprises performing a permutation on the numeric values contained in respective positions of vector $V_I$. As previously described, vector $V_I$ is actually a vector of integer numbers, each of which describes in which position of the array 100 a respective item $I_1$-$I_N$ (or, rather the value $J_1$-$J_N$ associated with each respective item $I_1$-$I_N$) is inserted. The permuting step therefore comprises the steps of:

(a)—selecting a first numeric value contained in a respective first field of vector $V_I$ (e.g., $V_I(1)$, containing the number "1");
(b)—selecting a second numeric value contained in a respective second field, different from the first field, of vector $V_I$;
(c)—swapping the first, numeric value contained in the first field and the second numeric value contained in the second field, with each other.

The permuting step also comprises the optional step of:
(d)—repeating steps (a)-(c).

Figure 6:
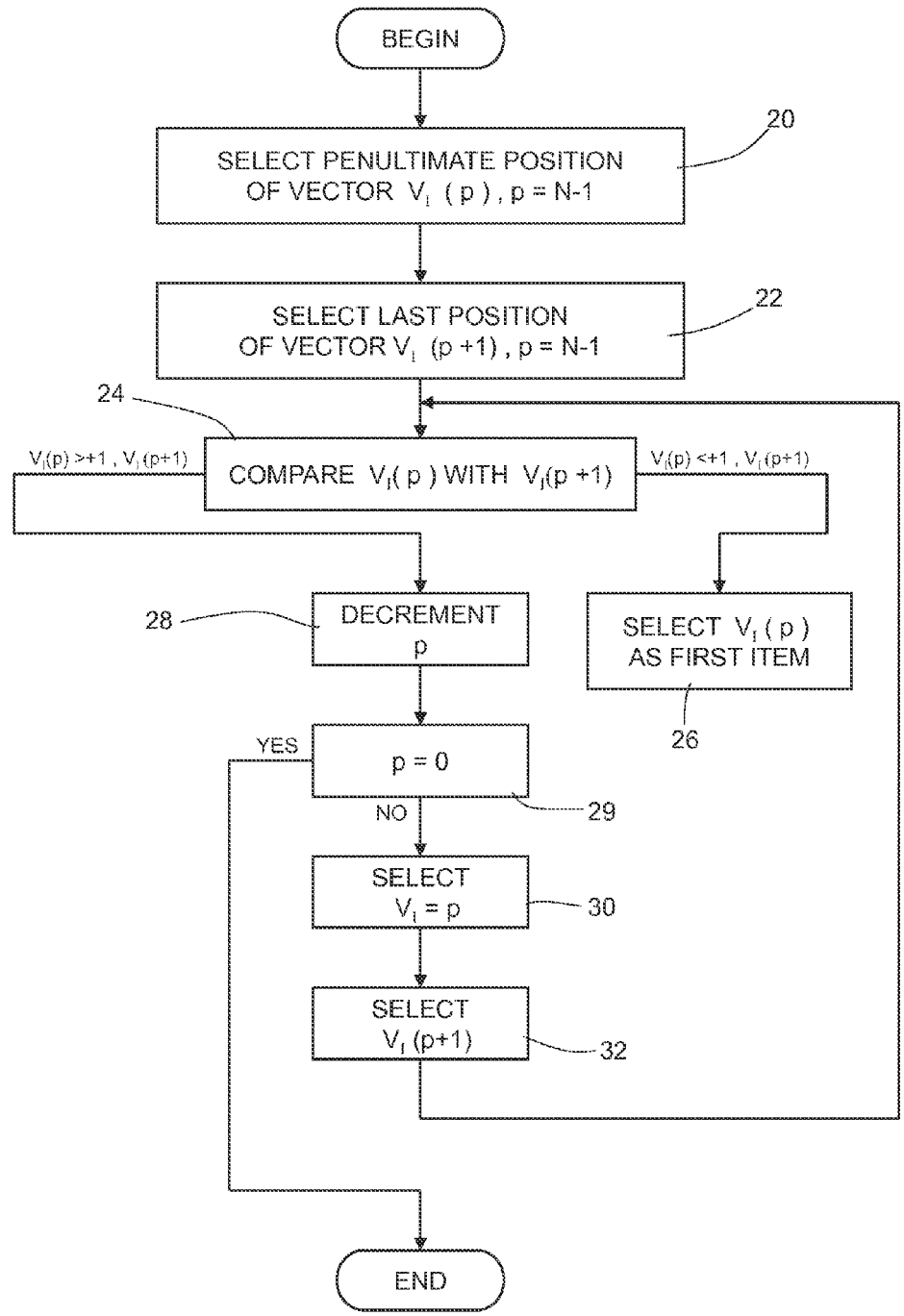
FIG. 6 shows, by means of a flowchart, the sub-steps of the method in FIG. 3.
Figure 7:
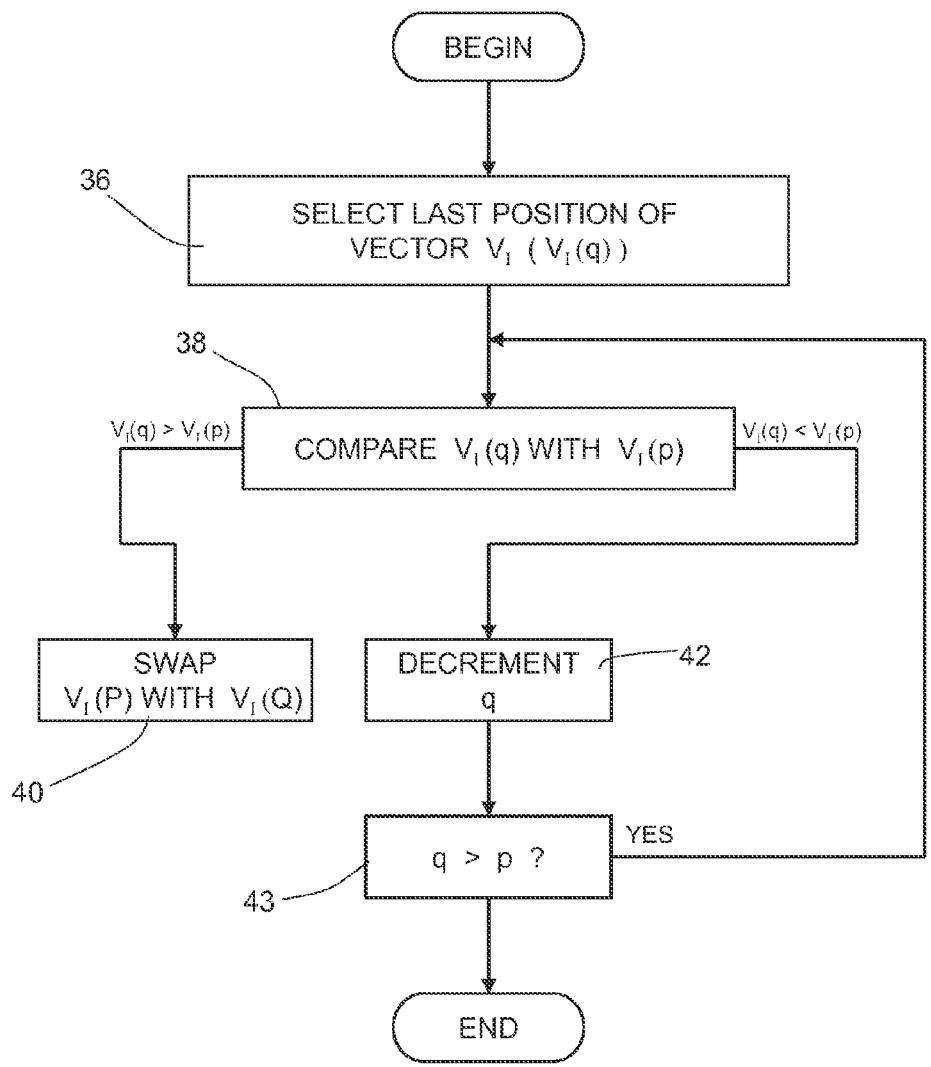
FIG. 7 shows, by means of a flowchart, further sub-steps of the method in FIG. 3.

FIGS. 6 and 7 show the above-mentioned steps (a)-(d) in greater detail, by means of flowcharts.

With reference to FIG. 6, in step 20, it is assumed to be at the first iteration of the method in FIG. 6. Vector $V_I$ is, for example, of the type $V_I=\{1, 2, 3, 4\}$. Variable p is an index that identifies, in this example, a field of vector $V_I$ and can take values from 1 to (N−1), in this case (N−1)=4. The penultimate position of vector $V_I$, which is $V_I(p)=V_I(N-1)=V_I(3)=\{3\}$, is selected.

Then, in step 22, the last field of vector $V_I$ is selected, i.e. $V_I(p+1)=V_I(N)=V_I(4)=\{4\}$.

Afterwards, in step 24, the values contained in fields $V_I(N-1)$ and $V_I(N)$ are compared to each other. If $V_I(N-1)$ is less than $V_I(N)$, then, in step 26, $V_I(N-1)$ is selected as the first item according to the above-mentioned step (a).

Otherwise, in step 28, value p is decremented by one unit and it is checked, in step 29, if the beginning of vector $V_I$ has been reached. If the current value of p is equal to 0 then vector $V_I$ has been exited and all possible permutations have been made (the method ends). If p is greater than or equal to 1 then, in step 30, $V_I(p)$ is selected; and, in step 32, $V_I(p+1)$ is selected. Processing then returns to step 24 for comparing $V_I(p)$ with $V_I(p+1)$.

Continuing with the previous example, given vector $V_I=\{1, 2, 3, 4\}$, step 24 leads to step 26, as $V_I(N-1) < V_I(N)$.

Steps 28-32 are not performed, and value $V_I(N-1)=3$ is thus selected as the first numeric value of the above-mentioned step (a).

Processing then passes to the selection of the second numeric value, according to the above-mentioned step (b). With reference to FIG. 7, in step 36, the last value of vector $V_I$ (i.e. $V_I(N)$) is selected in the first iteration of the method in FIG. 7. According to the method in FIG. 7, index q is used to index vector $V_I$. Therefore, in step 36, q=N.

Then, in step 38, the value $V_I(p)$ selected in step 26 in FIG. 6 is compared with the current value $V_I(q)$. If $V_I(q)>V_I(p)$, then, in step 40, the value contained in field $V_I(p)$ is swapped with the value contained in field $V_I(q)$. In this case, always considering vector $V_I=\{1, 2, 3, 4\}$, step 40 leads to the operation of vector $V_I=\{1, 2, 4, 3\}$.

If the comparison in step 38 reveals $V_I(q)<V_I(p)$, then, in step 42, value q is decremented by one unit. In step 43, it is checked whether the current value of q is greater than the current value of p. If true, processing returns to step 38 for a new comparison between $V_I(p)$ and $V_I(q)$; if false, the method ends.

Then, processing passes to the previously mentioned "swapping" step. During this step, the numeric values contained in the N−p positions of vector $V_I$ that follow the p'th position are subdivided into two subgroups of (N−p)/2 values each. The position of the two subgroups of (N−p)/2 values are then swapped. In the case where N−p is an odd number, it is possible to consider N−p+1 fields, or choose a different group.

Returning to vector $V_I$ generated after step 40 in FIG. 7, i.e. $V_I=\{1, 2, 4, 3\}$, the value of the index p is equal to 3 and the swap step has no effect.

By iterating steps 20-32 in FIG. 6 and FIG. 7 again (second iteration), the new $V_I$ vector that is obtained has the following form:

$$V_I=\{1,3,4,2\}.$$

Then, performing the swap step gives:

$$V_I^{(2)}=\{1,3,2,4\}.$$

By iterating steps 20-32 in FIG. 6 and FIG. 7 again (third iteration), the vector $V_I$ that is obtained has the following form:

$$V_I^{(3)}=\{1,3,4,2\}.$$

In this case, the swap step does not change the vector $V_I=\{1, 3, 2, 4\}$.

By iterating steps 20-32 in FIG. 6 and FIG. 7 again (fourth iteration), the vector $V_I$ that is obtained has the following form:

$$V_I=\{1,4,3,2\}.$$

Then, performing the swap step gives:

$$V_I^{(4)}=\{1,4,2,3\}.$$

Processing continues in this way, obtaining all the possible permutations of the numeric values contained in vector $V_I$.

In order to make the order of the items $I_1$-$I_N$ in the array 100 random at the time of its first generation, it is possible to perform iterations of the steps of the methods in FIGS. 6-7 and of the swap step "A" times (where A is a random number), so as to generate an order of the numeric values in vector $V_I$ that is not predeterminable beforehand.

According to a further embodiment, each iteration of the steps of the methods in FIGS. 6-7 is performed "B" times before performing the swap step.

The step of defining the (vector) set $V_{RB}$ of N+1 random numbers, where each of these numbers identifies the length in bytes of a respective block $RB_{x,y}$ satisfies at least one of the following requirements:

(1) at least one block $RB_{x,y}$ (of any size/length in bytes) is inserted before the first item $I_1$-$I_N$ in the array 100;

(2) at least one block $RB_{x,y}$ (of any size/length in bytes) is inserted between two consecutive items $I_1$-$I_N$ along the rows x of the array 100, so as to separate the two consecutive items $I_1$-$I_N$ from each other;

(3) at least one block $RB_{x,y}$ (of any size/length in bytes) is inserted after the last item $I_1$-$I_N$ in the array 100;

(4) de probability distribution of the lengths in bytes of each block $RB_{x,y}$ is uniform; and (5) the sum $S_{RB}$ of the lengths, in bytes, of all the blocks $RB_{x,y}$ is such that the array 100 is completely filled (i.e. $\Sigma_i L(i) + S_{RB} = M$).

(6) According to one embodiment of the present invention, the length of a respective block $RB_{x,y}$ satisfies all of the previous requirements (1)-(5).

Returning to the flowchart in FIG. 3, in step 14, the array 100 generated according to steps 10 and 12 is encrypted using a key $k_s$ generated randomly by the authentication token 1 in FIG. 1. Depending on the encryption algorithm chosen, key $k_s$ can be generated according to a standard method. In the case described by way of example, it is the token that handles its generation. Thus, the encryption step using key $k_s$ invokes this standard routine (and therefore, in itself, not the subject of the present invention). For example, in the AES cryptographic method, the key is as long as the minimum block of encryptable data (typically 32 bytes) and is generated from an initialization vector that the user can choose or have generated in a random manner.

In addition, the array 100 is encrypted using a cryptographic method of known type, for example an asymmetric encryption algorithm, such as RSA, or a block-based encryption algorithm such as AES (Advanced Encryption Standard), or the DES (Data Encryption Standard) algorithm, or any other encryption algorithm known in the literature. The above-mentioned encryption algorithms RSA, AES and DES are known in the literature and the associated encryption steps are not specified here for brevity. The generation of the keys $k_s$ is also performed, as stated, by methods known in the literature.

An encrypted array (or, in general, an encrypted text object), hereinafter indicated as "C_data", is obtained as a result of step 14 in FIG. 3.

Both the key $k_s$ and the encrypted text object C_data are stored in the private area 4a of the memory 4 of the authentication token 1.

Similarly to that described with reference to the encryption of the array 100, the seal scheme vector SS, which represents the read key for the array 100, is also encrypted (step 14) by means of a respective key $k_v$ generated randomly by the authentication token 1 in FIG. 1. The generation of key $k_v$ takes place in a similar manner to the generation of key $k_s$, by means of a freely chosen known method. For example, referring again to the AES algorithm, this key $k_v$ is generated by an initialization vector that is different from the initialization vector used for key $k_s$.

Vector SF is also encrypted with known algorithms, similarly to the array 100. For example, the AES encryption algorithm could be used. Nevertheless, it is clear that other algorithms can be used.

Both key $k_v$ and the encrypted seal scheme vector SS (hereinafter also indicated as "C_scheme") are saved in the private area 4a of the memory 4 of the authentication token 1. The encrypted text object C_data constitutes a "seal" that holds information (items $I_1$-$I_N$) the knowledge of which is a necessary condition to enable access to further data and/or information that it is wished to protect. For example, continuing with reference to the preferred application of the present invention, the decryption and the reading of this seal is requisite for authorizing the execution of a software program, or obtaining a license to use this software program. As previously stated, a copy of vector I that contains items $I_1$-$I_N$ is saved in the software program in a manner that is not accessible to a user of the software program. Verification of correctly reading the array 100 (using the seal scheme SS) is performed by comparing the items $I_1$-$I_N$ read in the array 100 with the items $I_1$-$I_N$ of vector I saved in the software program.

Figure 8:
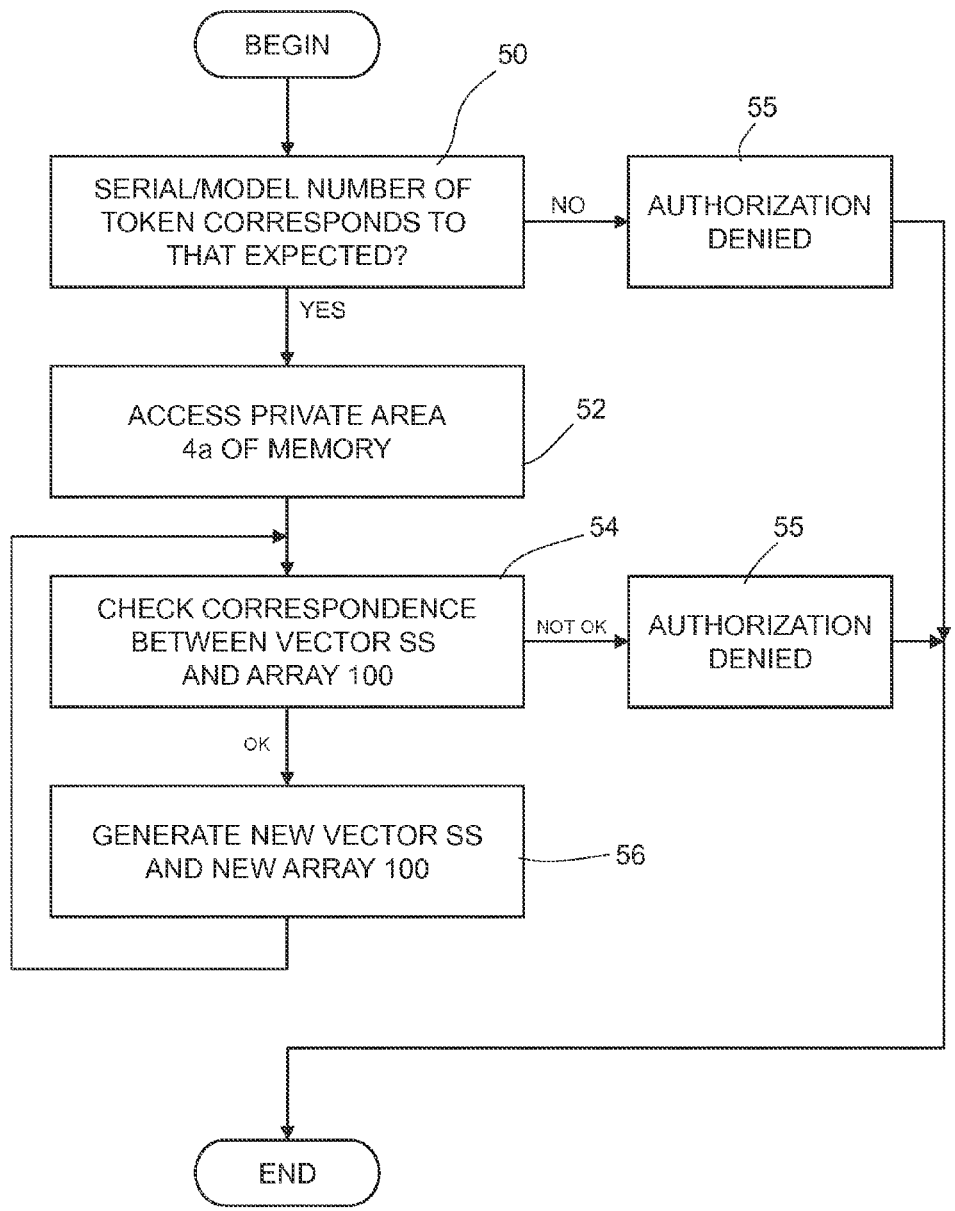
FIG. 8 shows, by means of a flowchart, further steps of the data protection method according to the present invention.

For authorizing access to this further data/information/software program, the steps of a method according to FIG. 8 are performed.

First of all, in step 50, a check is made to establish whether the authentication token 1 used corresponds to the expected authentication token 1.

This check can be performed by checking that the model and/or serial number of the authentication token in use are consistent and compatible with those expected.

In the case where the check in step 50 provides a positive result, then, in step 52, access is made to the private area 4a of the memory 4 to verify if the seal is integral or has been altered. Access to the private area 4a of the memory 4 takes place, as stated, with a PIN that is generated in the license initialization step and consists of a set of printable characters (alphanumeric plus symbols) of sufficient length (for example, 127 characters) to render any attempted attacks ineffective or particularly difficult. In fact, in the event of trying to guess this PIN by successive attempts, if a predetermined number of failed attempts is exceeded, the token is locked in an irrecoverable manner, forcing the software manufacturer to be contacted, who is the only one that can unlock it.

According to one embodiment, the following steps are performed: (a) when the user attempts to start the software to be protected, the latter prompts the user to insert the token and a personal password; (b) the user provides his/her personal password as requested in previous point (a); (c) the software to be protected checks, with its own method that is not part of the present invention, that the user's personal password is correct (e.g., in the case where a hash function is used, it computes the hash and checks it with a previously stored hash, for example in a file, in a database, on a server, etc.); (d) if the check in the previous point (c) is passed, the software to be protected uses the PIN corresponding to the user's license to open communications with the token and perform the relevant checks according to the steps of the method of the present invention.

Then, in step 54, using keys $k_s$ and $k_v$, the encrypted text object C_data and the encrypted seal scheme SS C_scheme are decrypted, in a known manner using the encryption algorithm used according to steps 14 and 16 in FIG. 3. The consistency is then checked between the positions of the items $I_1$-$I_N$ in the array 100 as identified by the seal scheme SS and the effective positions of the items $I_1$-$I_N$ in the array 100.

In a first check, by reading the positions specified in the seal scheme SS, it is verified that the content read from the array 100 is consistent with the items $I_1$-$I_N$ of vector contained in the software program that it is wished to protect, for example by checking one or more of the following parameters: (i) field cardinality; (ii) field length; (iii) field type (number, string, date, etc.); (iv) content of fixed fields (e.g., name of software manufacturer); consistency between software and the software name specified in the seal; (vi) consistency between information regarding the hardware that contains the seal (for example, the serial number of the token chip), obtained by interrogating the hardware, and the equivalent data inscribed in the seal. In particular, this last point (vi) implies that in the case where an ill-intentioned person succeeds in totally copying (without destroying the chip at the same time) the content of private memory area 4a into another token of the same model, access to the data would still be denied, because it is tied to that particular piece of hardware (token).

In this step, the method also provides for reading the variable information. By way of non-limitative example, this information comprises one or more of the following: license number; name of client; date/time of generation of current seal; modules activated by the license (if applicable).

In the case where access to the data/information to be protected is denied, step 55, the method in FIG. 8 ends.

In the case where access to the data/information to be protected is allowed, then, in step 56, a new seal scheme vector SS is randomly generated and, on the basis of the new seal scheme vector SS thus generated, a new array similar to array 100 is generated. According to one embodiment, the new array contains the same items $I_1$-$I_N$ of the array 100, arranged according to a new order and separated by blocks $RB_{x,y}$ having different numbers of bytes. Alternatively, according to a different embodiment, the new array contains items $I_1^{(a)}$-$I_{N'}^{(a)}$ different from items $I_1$-$I_N$ of array 100; the number N' of items $I_1^{(a)}$-$I_{N'}^{(a)}$ can also be different from the number N of items $I_1$-$I_N$. According to a further embodiment, the new array contains items $I_1^{(a)}$-$I_{N'}^{(a)}$ that are partly common to items $I_1$-$I_N$ of the array 100 (for example, the fixed fields are the same) and partly different (for example, the variable fields could be different). In this way, a new seal is generated.

The data fields used for generating the new seal are the same ones of the original seal as already described hereinbefore. The date/time data is provided by the local computing device on which the software is running during the generation of the new seal. The scheme is made to evolve from the current permutation in which it finds itself. The reserved spaces for the random bytes (RB) are reallocated in a random manner (using the same previously described criterion).

Every time the seal is made to evolve according to step 56 in FIG. 8, the encryption steps according to steps 14-16 in FIG. 3, not described here for brevity, are also performed.

Then, after a certain predetermined or random period of time, consistency between current seal scheme SS and the current array is checked again, as described with reference to step 54.

Steps 54-56 continue to be iterated until step 54 provides a result considered to be acceptable, i.e. such that the arrangement of the items $I_1^{(a)}$-$I_{N'}^{(a)}$ in the current array is consistent with the arrangement as identified by the current seal scheme SS, and the sizes in bytes of the blocks $RB_{x,y}$ are consistent with the sizes specified by the current seal scheme SS.

When step 54 provides a positive result as output (correspondence between vector SS and array 100), then the token used is considered valid and authorization is obtained to access the subsequent data and/or information (e.g., authorization to execute a software program, or obtain a license to use this software program).

From this moment on and for the duration of the current usage session of the software, it is only checked that the token hardware continues to respond with its own identity, which has been previously confirmed.

Nevertheless, the previously described in-depth checking can be invoked again by the software on the basis of the event of the user requesting to use functions that are considered critical for using the software (or those that the manufacturer considers of greater value).

In the event of the token being disconnected, this situation is detected and reinsertion of the same token is required (by "same", the one with that particular serial number is intended), with the reinitialization of the entire checkout procedure once it is inserted.

Otherwise, if the token is not inserted or has a different serial number, the software aborts its execution (which means that once a session is started with one token, it is not possible to continue with another token, even if this other token contains a valid license).

The advantages of the system and method according to the present invention are evident.

For the choice of ordering in the vector containing the information items $I_1$-$I_N$, the (mathematically provable) fact that one and only one way exists of traversing all of the possible permutations of the N items by swapping the positions of a pair at a time, according to the concept of so-called lexical permutations (obtainable according to the Teinhaus-Johnson-Trotter algorithm), is exploited. This method is computationally efficient and forms a Hamiltonian path, i.e. visits all of the vertices of a hypothetical permutahedron, passing through each vertex only once. In this case, the permutahedron is a hypothetical solid in which each vertex contains a possible combination of the information items $I_1$-$I_N$ different from the other combinations present on the remaining vertices.

The way of traversing this sequence is chosen according to an ad hoc criterion: in fact, by jumping along the sequence by a number of steps chosen so as not to be an integer divisor of the number of items (which is N! (N+1)!), it is guaranteed that the original sequence will be generated in a unique Hamiltonian cycle. Essentially, the sequence becomes an acyclic loop. In this way, a so-called proof of knowledge system is defined, where the token is the holder of the "knowledge" (or, in other terms, of the seal).

The software component is configured to check the soundness of the seal, which demonstrates the veracity of the license (and therefore serves as "proof" or "witness") present on a generic valid token that holds the test data/information.

Thus, taking the above into account, and that the cryptographic system comprises the functions of initialization of the first seal, opening the seal, and validating the seal;

the seal changes form each time according to a random scheme that does not alter the content of the license, but changes the arrangement with respect to the random material of the rest of the message;

the completeness criterion is satisfied, i.e. the verification of each initial and subsequent seal as successful, whatever the scheme adopted for the license;

the perfect soundness criterion is satisfied, as the probability of having the seal accepted is null if the seal is not in the correct form (e.g., if counterfeited between two successive checks), and so each verification of this system is of the non-interactive zero-knowledge proof type and it should be specified that it uses an evolutive commitment scheme. In conclusion, apart from the obvious increase in security, the advantages obtained are:

(i) even though requiring the transmission of data, the security of the license information is not compromised in the exchange of data between the software and the hardware necessary to validate the license (because it is not revealed); and (ii) at the same time, the possibility of managing multiple floating licenses on multiple machines with a same software is maintained (i.e. the most general situation where there are a multiple machines and multiple users and each user can work on the machine they prefer).

Regarding the use of she PIN, at she first initialization, the code in question is generated automatically so as to be very long (e.g., 128 characters) and is not disclosed to the user, but is used automatically and transparently at low level by the software. In this way, bearing in mind that the token can be configured to automatically lock itself after a predetermined number of failed attempts (for example 3 or 4), the probability of access to the private area of the token by an unauthorized user wanting to access the content is minimized.

Furthermore, according to the present invention, various levels of protection are provided:

(1) a physical level, which requires access to the authentication token 1, and is such that the chip is tamper proof, or rather if it attempted to physically extract the chip, it is practically impossible to recover the information saved therein, which becomes lost/destroyed;
(2) a private memory area 4a, which is hidden from the user and only accessible via the password set by the manufacturer of the software;
(3) a cryptographic level, which enables further protection of the information in the event of the private area 4a of the memory being discovered and/or its access password becoming known;
(4) a reciprocal arrangement scheme of the items $I_1$-$I_N$ such that the simple reading of this scheme or of the array generated from this scheme does not allow the data arranged according to this scheme to be easily recovered;
(5) a consistency verification mechanism such that access or decryption attempts that cause even minimum changes to the data stored in the array trigger the invalidation of the seal.
(6) the possibility of installing the software on multiple machines and implementing a floating license that only enables the machines on which the token(s) containing the license(s) is/are inserted. For example, installation on 10 machines, but with only 3 tokens.

Finally, it is clear that modifications and variants can be made to the invention described and illustrated herein without leaving the scope of protection of the present invention, as defined in the appended claims.

For example, the private area 4a of the memory 4 could accommodate a plurality of seals generated as previously described, so as to simultaneously manage a plurality of software and users.

The invention claimed is:

1. An authentication system for authorizing an access to information to be protected, comprising:
 a hardware token having a memory including a private memory area accessible by a personal identification number and storing:
 a plurality of first information items of at least one of numeric, alphanumeric and alphabetic type; and
 a plurality of first random data items of at least one of numeric, alphanumeric and alphabetic type, each having a respective size,
 wherein said first information items and said first random data items are arranged in an array having at least one reading order and such that each one of said first information items is separated from a successive one of said first information items, in said reading order, by one of said first random data items,
 wherein the private memory area stores a first seal scheme vector of encrypted type containing first relative arrangement information of the first information items in the array and first size information of each one of said first random data items so as to allow access to each of the first information items in the array,
 said authentication system being further configured to:
 subject access to the private memory area to the insertion of said personal identification number;
 decrypt the first seal scheme vector and acquire said first relative arrangement information of the first information items and said first size information of each one of said first random data items in the array;
 check correspondence between said acquired first relative arrangement information and the arrangement of the first information items in the array and between said acquired first size information and the size of the first random data items in the array;
 authorize or deny access to said information items to be protected on the basis of a result of said correspondence check between said acquired first relative arrangement information and the arrangement of the first information items in the array and between said acquired first size information and the respective sizes of said first random data items,
 wherein the first relative arrangement information of the first information items follow each other in a random order in said first seal scheme vector,
 wherein said random order in which the first relative arrangement information items of the first information items follow each other is obtained by a random number of permutations of said first relative arrangement information of the first information items, and
 wherein performing said permutations comprises:
 (i) swapping the position of one initial information item chosen among the first information items with the position of another of the first information items;
 (ii) swapping the position of two or more information items chosen among said first information items, these positions being after the position in the array in which said initial information item was allocated prior to the swap operation (i).

2. An authentication system according to claim 1, further configured, in the case in which said authorization is denied, to:
 generate a second seal scheme vector, of encrypted type, containing second relative arrangement information of the first information items and second size information of second random data items;
 arrange the first information items in the array based on the second relative arrangement information and such that each first information item is separated from a successive first information item, in said reading order, by a respective second random data item having a size corresponding to said second size information; and
 subject a further granting of said authorization to access said information to be protected to: decrypting the first seal scheme vector and acquiring the first relative arrangement information and the first size information; and checking correspondence between the acquired first relative arrangement information and the arrangement of the first information items in the array, and between the acquired first size information and the size of the first random data items in the array.

3. An authentication system according to claim 1, further configured, in the case in which said authorization is denied, to:
- acquire second information items, each having a respective numeric, alphanumeric, or alphabetic value;
- generate a plurality of second random data items, each having a respective numeric, alphanumeric, or alphabetic value, and a respective size;
- generate a second seal scheme vector, of encrypted type, containing second relative arrangement information of the second information items and second size information of the second random data items;
- arrange the second information items in the array based on the second relative arrangement information and such that each second information item is separated from a successive second information item, in said reading order, by a respective second random data item having a size corresponding to said second size information; and
- subject a further granting of said authorization to access said information to be protected to decrypt the second seal scheme vector and acquiring the second relative arrangement information and the second size information and check correspondence between the acquired second relative arrangement information and the arrangement of the second information items in the array and between the acquired second size information and the size of the second random data items in the array.

4. An authentication system according to claim 1, wherein said first information items comprise at least one of fixed type data and variable type data.

5. An authentication system according to claim 1, wherein the number of first information items is equal to N and wherein the swap operation (i) is performed a number of times, chosen randomly and such that this number of times is not a divisor of $N!\cdot(N+1)!$.

6. An authentication system according to claim 5, wherein the swap operations (i) and (ii) are repeated a number of times equal to M, where M is an integer value greater than N.

7. An authentication system according to claim 1, configured to perform one or more permutations of the first relative arrangement information of the first information items of the first seal scheme vector so as to generate the second seal scheme vector.

8. An authentication system according to claim 1, further configured to encrypt the array by a first encryption key generated by an encryption algorithm.

9. An authentication system according to claim 8, wherein the first encryption key is stored in the private memory area of the memory.

10. An authentication system according to claim 1, wherein the first and second seal scheme vectors are encrypted by a respective second encryption key generated by an encryption algorithm.

11. An authentication system according to claim 10, wherein the second encryption keys are stored in the private memory area of the memory.

12. An authentication system according to claim 1, further configured to check if the hardware token corresponds to an expected hardware token.

13. An authentication system according to claim 1, wherein checking the correspondence between said first relative arrangement information and the arrangement of the first information items in the array comprises verifying at least one of consistency of a value of the first information items in the array with a respective expected value and a correspondence between a size of a respective first information item and an expected size for that first information item.

14. An authentication system according to claim 1, further configured to subject access to the private memory area to check whether a serial number of the hardware token corresponds to an expected serial number.

15. An authentication method for authorizing an access to information to be protected, comprising:
- acquiring a plurality of first information items of at least one of numeric, alphanumeric and alphabetic type;
- generating a plurality of first random data items of at least one of numeric, alphanumeric and alphabetic type, each having a respective size;
- arranging said first information items and said first random data items in an array having at least one reading order and such that each first information item is separated from a successive first information item, in said reading order, by one of said first random data items;
- generating a first seal scheme vector, of encrypted type, containing first relative arrangement information of the first information items in the array and first size information of each first random data item ($RB_{x,y}$) so as to allow access to each of the first information items in the array;
- subject granting of an authorization to access said information to be protected to: (i) entering a personal identification number; (ii) decrypting the first seal scheme vector and acquiring the first relative arrangement information and the first size information; and (iii) checking correspondence between the acquired first relative arrangement information and the arrangement of the first information items in the array, and between the acquired first size information and the size of the first random data items in the array; and
- granting said authorization in the case where said correspondence check is positive, wherein the first relative arrangement information of the first information items follow each other in a random order in said first seal scheme vector, wherein said random order in which the first relative arrangement information items of the first information items follow each other is obtained by a random number of permutations of said first relative arrangement information of the first information items, and wherein performing said permutations comprises:
(i) swapping the position of one initial information item chosen among the first information items with the position of another of the first information items;
(ii) swapping the position of two or more information items chosen among said first information items, these positions being after the position in the array in which said initial information item was allocated prior to the swap operation (i).

16. An authentication method according to claim 15, further comprising, in the case where said authorization is denied:
- generating a second seal scheme vector, of encrypted type, containing second relative arrangement information of the first information items and second size information of the second random data items;
- arranging the first information items in the array based on the second relative arrangement information, and such that each first information item is separated from a successive first information item, in said reading order, by a respective second random data item having a size corresponding to said second size information;
- subject a further granting of said authorization to access said information to be protected to: decrypting the first seal scheme vector and acquiring the first relative arrangement information and the first size information, and checking correspondence between the acquired first relative arrangement information and the arrangement of the first information items in the array, and between the acquired first size information and the size of the first random data items in the array.

17. An authentication method according to claim 15, further comprising, in the case where said authorization is denied:
acquiring second information items of at least one of numeric, alphanumeric and alphabetic type;
generating a plurality of second random data items of at least one of numeric, alphanumeric and alphabetic type, each having a respective size;
generating a second seal scheme vector, of encrypted type, containing second relative arrangement information of the second information items and second size information of the second random data items;
arranging the second information items in the array based on the second relative arrangement information and such that each second information item is separated from a successive second information item, in said reading order, by a respective second random data item having a size corresponding to said second size information; and
subject a further granting of said authorization to access said information to be protected to:
decrypting the second seal scheme vector and acquiring the second relative arrangement information and the second size information; and
checking correspondence between the acquired second relative arrangement information and the arrangement of the second information items in the array and between the acquired second size information and the size of the second random data items in the array.

18. An authentication method according to claim 15, wherein acquiring the plurality of first information items comprises acquiring fixed type data and/or variable type data.

19. An authentication method according to claim 15, wherein the number of first information items is equal to N and wherein the swap step (i) is performed a number of times chosen randomly and such that this number of times is not a divisor of $N!\cdot(N+1)!$.

20. An authentication method according to claim 19, wherein the swap steps (i) and (ii) are repeated a number of times equal to M, where M is an integer value greater than N.

21. An authentication method according to claim 15, further comprising performing a random number of permutations of the first relative arrangement information of the first information items of the first seal scheme vector so as to generate a random ordering of said first relative arrangement information.

22. An authentication method according to claim 15, further comprising encrypting the array using a first encryption key generated by an encryption algorithm.

23. An authentication method according to claim 15, wherein the first seal scheme vector is encrypted with a second encryption key generated by an encryption algorithm.

24. An authentication method according to claim 16, wherein the second seal scheme vector is encrypted with a third encryption key generated by an encryption algorithm.

25. An authentication method according to claim 15, wherein checking the correspondence between said first acquired relative arrangement information and the arrangement of the first information items in the array comprises verifying the least one of: consistency of a value of the first information items in the array with a respective expected value; and a correspondence between a size of a respective first information item and an expected size for that first information item.

26. A computer program product that is loadable in a processing device and configured so that, when executed, the processing device is configured for authorizing an access to information to be protected, comprising:
acquiring a plurality of first information items of at least one of numeric, alphanumeric and alphabetic type;
generating a plurality of first random data items of at least one of numeric, alphanumeric and alphabetic type, each having a respective size;
arranging said first information items and said first random data items in an array having at least one reading order and such that each first information item is separated from a successive first information item, in said reading order, by one of said first random data items;
generating a first seal scheme vector, of encrypted type, containing first relative arrangement information of the first information items in the array and first size information of each first random data item so as to allow access to each of the first information items in the array; subject granting of an authorization to access said information to be protected to:
(i) entering a personal identification number;
(ii) decrypting the first seal scheme vector and acquiring the first relative arrangement information and the first size information; and
(iii) checking correspondence between the acquired first relative arrangement information and the arrangement of the first information items in the array, and between the acquired first size information and the size of the first random data items in the array; and
granting said authorization in the case where said correspondence check is positive,
wherein the first relative arrangement information of the first information items follow each other in a random order in said first seal scheme vector,
wherein said random order in which the first relative arrangement information items of the first information items follow each other is obtained by a random number of permutations of said first relative arrangement information of the first information items, and
wherein performing said permutations comprises:
(i) swapping the position of one initial information item chosen among the first information items with the position of another of the first information items;
(ii) swapping the position of two or more information items chosen among said first information items, these positions being after the position in the array in which said initial information item was allocated prior to the swap operation (i).

* * * * *